Aug. 28, 1956
L. G. ARPIN
2,760,397
PRECISION ADJUSTMENT MEANS FOR POWER MACHINES
Filed Sept. 8, 1953
2 Sheets-Sheet 1
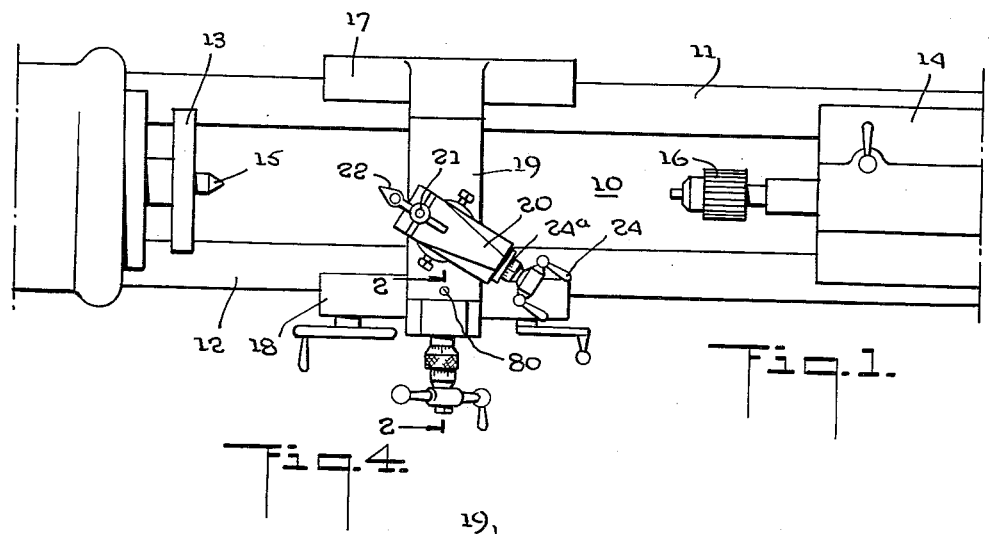
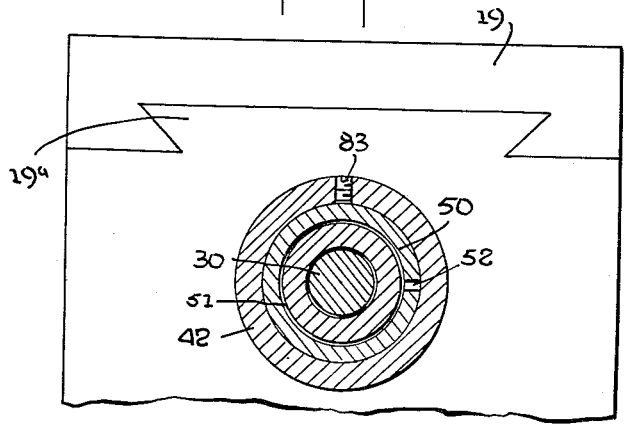
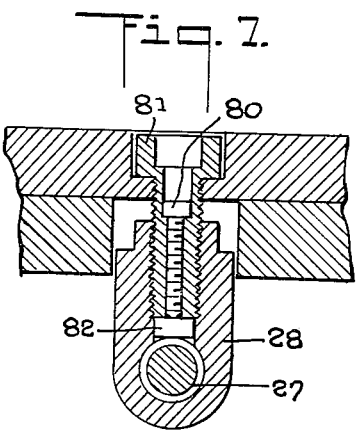
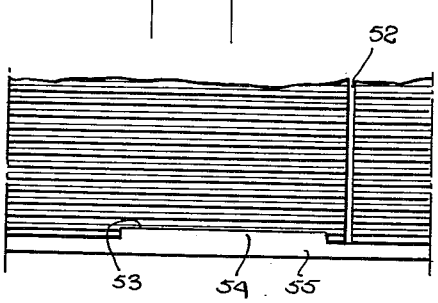
INVENTOR.
Leon G. Arpin
BY
P. Nepper Baker
ATTORNEY Aug. 28, 1956
L. G. ARPIN
2,760,397
PRECISION ADJUSTMENT MEANS FOR POWER MACHINES
Filed Sept. 8, 1953
2 Sheets-Sheet 2
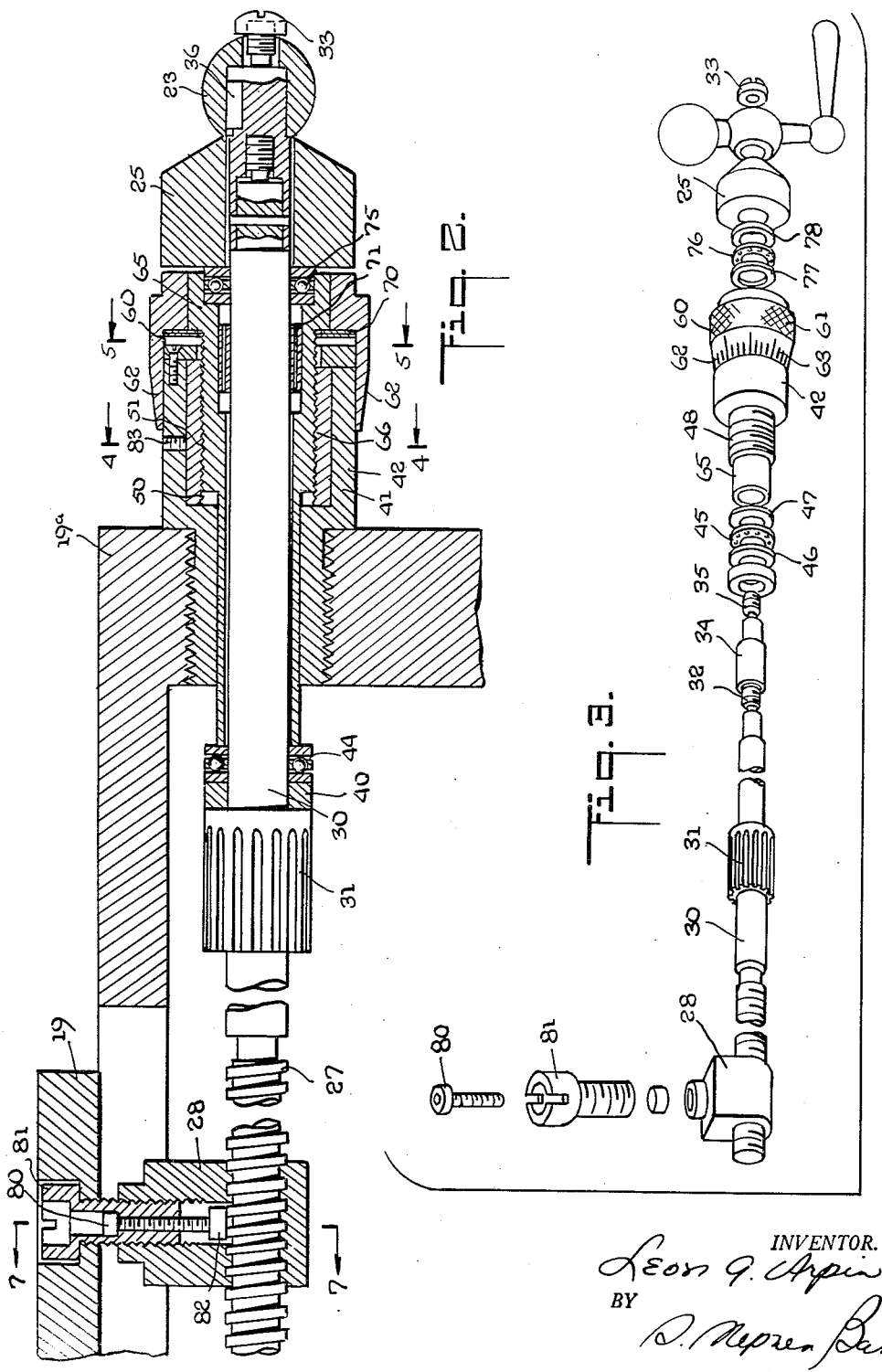
INVENTOR.
Leon G. Arpin
BY
ATTORNEY

United States Patent Office 2,760,397
Patented Aug. 28, 1956

2,760,397

PRECISION ADJUSTMENT MEANS FOR POWER MACHINES

Leon G. Arpin, Montclair, N. J.

Application September 8, 1953, Serial No. 378,879

1 Claim. (Cl. 82—21)

This invention relates to an attachment for power machinery such as lathes, milling machines and similar mechanisms and which improves the tool adjustment characteristics thereof.

The machine attachment of the instant invention provides means for making positive precise adjustments of a cutting tool where only close tolerances are permitted and where precise dimensions are required. The device of the instant invention is illustrated as applied to a lathe and adapts it for high precision and accurate machining operations.

As is well understood, in conventional lathes the tool holder is fixed in a compound which comprises a slidable head operating in a dovetail groove. Movement of the slidable head is controlled by a feed screw of a given pitch. The feed screw is disposed within an internally threaded nut and rotation of the screw produces relative movement between it and the slidable compound head. In the upper compound upon which is secured the tool holder, the internally threaded nut is usually fixed and the compound feed screw moves transversely as it is rotated. The lower compound is integral with a cross slide and a cross feed screw actuates the cross slide so as to produce the desired adjustment. In this case, the internally threaded nut is usually movable, the feed screw being fixed against transverse movement. The actions of the cross feed screw and the compound feed screw are alike although in one case, the co-acting nut is stationary while in the other it is movable. In either case, the movable element produces the desired adjustment.

The device of this application is adapted to the lower or upper compounds and, although it is illustrated as actuating the cross slide or lower compound, it will be understood that substantially the same mechanism will be employed for actuating the upper compound slide.

This application discloses a device which is interposed between the conventional feed screw crank handle and the compound which is actuated by rotation of the feed screw. The device produces precision adjustment of the feed screw by body movement thereof while eliminating any possibility of turning of such lead screw during such body movement. It is essential to prevent any turning because the pitch of the feed screw is very great and a slight rotation thereof can produce a misadjustment of considerable degree. This invention is therefore directed to both a simple and a reliable mechanism for effecting the above desired results.

The invention will further be understood from the following description and drawings in which:

Figure 1 is a top plan view, partly broken away, of a lathe showing the work holding and cutting means;

Figure 2 is an enlarged cross-sectional view taken substantially along the line 2—2 of Figure 1;

Figure 3 is an exploded view illustrating the various components of the attachment and their application to a feed screw mechanism;

Figure 4 is an enlarged cross-sectional view taken substantially along the line 4—4 of Figure 2;

Figure 5 is a cross-sectional view as taken along the line 5—5 of Figure 2;

Figure 6 is a developed view of the finely threaded feed bushing which is secured to the inner wall of the feed cylinder for actuating the feed screw; and Figure 7 is a cross-sectional view as taken along the line 7—7 of Figure 2.

The invention is illustrated as applied to the lathe in which 10 is the bed, 11 and 12 the bedways, 13 the headstock and 14 the tailstock. Headstock 13 is illustrated as carrying a center 15, while tailstock 14 carries a chuck 16 between which the work is supported.

Slidably arranged on the ways are the saddle members 17 and 18 which bear the cross slide 19. Disposed on the cross slide is the upper compound 20 which carries the tool holder 21 which in turn carries the cutting tool 22. It will be recognized that the upper compound may be actuated bodily by the slide 19 by operating the bolt and crank handle 23 while the compound head alone may be actuated by operating the handle 24.

It will be understood that when the handle 24 is rotated, employing the indicia 24a as a reference means, the upper compound feed screw is actuated and the compound head or slide is moved accordingly. In the same way, when handle 23 of the lower compound is rotated, the cross feed screw is actuated and the upper compound is moved bodily.

In the instant device, which is illustrated as being connected to the cross feed screw 27 of the lower compound as shown in Figure 2, that feed screw is adjusted in a conventional manner for making normal adjustments. Thus, handle 23 is rotated, which in turn rotates the feed screw 27. This causes the internally threaded cross feed nut 28 (Figure 2), to travel transversely of the feed screw which is itself normally fixed against any movement other than rotational. Such transverse movement of the feed nut is transmitted to the cross slide 19 which, as above stated, carries the compound 20.

As in conventional lathe equipment, the handle 23 is followed by a dial wheel 25 to which reference is made in making adjustments. However, the conventional tapered collar which is usually disposed between the wheel 25 and the dovetail support or cross slideway 19a is replaced by components of the instant invention as will be shown hereinafter.

Screw 27 is conventionally formed with an unthreaded shaft portion 30 upon which is disposed a pinion gear 31 and a reduced, screw threaded tip 32 which is normally engaged by the handle nut 33. It is on the unthreaded shaft portion 30 that most of the components of the instant device are mounted and, an extension adapter 34, is secured to tip 32 so that the threaded tip 35 of extension 34 may be engaged by nut 33 as illustrated in Figure 2. Adapter 34 is formed with a keyway 36 which is engaged by the crank handle so as to prevent relative rotational movement thereof.

Pursuant to the instant invention, a spacer 40 in the form of a washer is first applied on shaft portion 30, forwardly of pinion 31. Spacer 40 is only required in certain lathe mechanisms to secure a tight fit of the parts. A bushing 41 having a head 42 and an externally threaded neck 43 is slipped over shaft portion 30. Neck 43 is formed with outer screw threads 48 which engage corresponding screw threads in the apron or slideway 19a.

To the arcuate inner surface of hollow head 42 is secured a finely threaded feed bushing or liner 50 having inner threads 51. Bushing 50 is provided with a longitudinal slot 52 (Figs. 6 and 7), to enable adjustment thereof if backlash should develop as hereinafter set forth. In order to maintain bushing 50 in position, it is formed with an arcuate cut-out 53. Cut-out 53 is engaged by the arcuate tongue or key 54 of a retaining ring 55 which is secured to the outer end wall of head 42 as by screws as illustrated.

A thrust bearing 44 is disposed on shaft portion 30 following spacer 40. The thrust bearing comprises the ball bearing ring 45 and collars 46 and 47. The transversely movable element of my precision adjusting mechanism bears against this thrust bearing as will be hereinafter described.

An annular dial 60 is provided with a knurled head 61 and an inwardly beveled ring portion 62 which bears indicia 63 and embraces head 42 of bushing 41. Tightly secured within dial 60 is an elongated cylinder 65 having a finely threaded portion 66 which engages the threads 51 of bushing 50 and an outer end portion which bears against the thrust bearing 75 as above mentioned. Cylinder 65 is practically integral with dial 60 so that as dial 60 is screwed over head 42, the threaded portion 66, functioning as a male member, engages the threads 51 of bushing 50, functioning as a female member. As these parts are screwed together, the indicia ring 62 rotates and travels transversely or slidably over head 42. In order to prevent jamming when these parts are screwed together to complete telescoping position, a pair of brass washers 70 is provided.

It is essential to isolate any rotational movement of the precision adjusting mechanism herein from the feed screw 27 including its unthreaded shaft portion 30. Accordingly, I provide a needle bearing 71 as well as other mechanism as hereinafter set forth. Needle bearing 71 is disposed within an annular chamber formed in cylinder 65 and bears against shaft portion 30. A second thrust bearing 75 is also provided and comprises the ball bearing ring 76 and collars 77 and 78. Bearing 75 is embraced by the forward end of cylinder 65 and bears against indicia wheel 25.

In addition to the above mentioned components for inhibiting turning of the screw 27 with rotation of shaft mechanism, more positive means are employed for preventing any shaft rotation when the precision adjusting mechanism is employed. Thus, a screw 80 is disposed in the feed nut locking bolt 81. As will be noted in Figure 2, bolt 81 is countersunk in cross slide 19 and is threadedly secured to the feed nut 28. Ordinarily, the bolt 81 is hollow so as to permit the application of lubricating oil to the screw 27. However, in accordance with this invention, I thread the hollow of the bolt so as to threadedly engage the shank of screw 80. A brass pad 82 is disposed between the end of screw 80 and the screw 27 so that pressure may be brought against screw 27 for restraining rotation thereof while avoiding injury to its threads or forcing the screw shank between such threads.

The invention is practiced as follows:

When normal adjustment is required, the handle 23 is actuated in a conventional manner for rotating the feed screw 27. At this time, the screw 80 must be in an upward, disengaged position, so that rotational movement of screw 27 is unimpeded. This produces transverse movement of nut 28 and of slide 19 in a normal manner.

After the normal adjustment has been made, steps may be taken to effect a required precision adjustment. For this purpose, screw 80 is tightened down until the brass pad 82 bears against screw 27 so as to positively prevent rotation thereof. Dial 60 is then rotated over head 42 is accordance with indicia 62. Ordinarily, head 42 will bear a reference arrow or the like, which is consulted in conjunction with the indicia.

When the dial 60 is rotated in a clockwise direction, the threads 66 engage the threads 51 and the cylinder 65 is driven inwardly. Its end therefore forces the thrust bearing 44 correspondingly inwardly and the pinion 31 transmits such pressure to the feed screw 27 causing it to travel inwardly bodily and thereby carrying the slide 19 with it. Upon reverse rotation, the thrust bearing 75 forces the screw outwardly. Thus substantially the entire adjustment mechanism is disposed between the two thrust bearings which transmit the lengthwise forces to the feed screw. As a result of such construction, the mechanism can be tightly compacted as securely as desired between the pinion 31 and screw 33 without encouraging the imparting of rotational forces to the feed screw. Since the brass pad 82 is tightened down on the thread portion of the screw, any possibility of rotation is completely eliminated.

I further provide means for insuring accuracy over long periods of use. Thus, head 42 of bushing 41 is provided with an adjustment screw 83 which bears against the finely threaded feed bushing 50. It will be recalled (see Figure 6) that bushing 50 is provided with a longitudinal slot 52. When screw 83 is tightened down, it reduces the inside diameter of bushing 50 by reducing the slot width. This forces the threads 51 into firmer contact with threads 66. Accordingly, it will be recognized, that in the event of backlash or the like, any looseness which develops can be taken up by adjusting screw 83.

What is claimed is:

In a power machine having a feed screw with a pinion formed thereon, a feed nut embracing said screw and a compound operatively connected to said feed nut, the combination therewith of a precision adjusting mechanism, said mechanism comprising a bushing fixedly connected to said machine, a rotatable dial threadedly connected to the interior of said bushing, a cylinder connected to said dial and extending through said bushing and being adapted for transverse movement therethrough as the dial is rotated thereover, a pair of thrust bearings at the respective ends of said cylinder, the inner of said thrust bearings bearing against said pinion so as to transmit transverse movement of said cylinder in one direction to said feed screw as the dial is rotated, a roller bearing disposed within said cylinder and surrounding said feed screw, said mechanism further comprising a finely threaded liner for said bushing and to which said dial is threadedly connected, said liner being formed with a longitudinal slot and compression means therefor for adjusting the diameter of said liner, said liner being further formed with an arcuate cut-out, a retaining ring connected to an end wall of said bushing and maintaining said liner against displacement therein, an arcuate tongue on said retaining ring fitted into said arcuate cut-out of said liner, and a tightening bolt extending through said compound and feed nut and exerting pressure against said feed screw for preventing rotation thereof when the dial is rotated.

References Cited in the file of this patent

UNITED STATES PATENTS

| 439,660 | Holmquist | Nov. 4, 1890 |
|---|---|---|
| 940,928 | Hanson | Nov. 23, 1909 |
| 1,153,861 | Dudley | Sept. 14, 1915 |
| 1,290,550 | Hardinge | Jan. 7, 1919 |
| 2,155,707 | Groene | Apr. 25, 1939 |
| 2,565,628 | Ravilious | Aug. 28, 1951 |
| 2,677,296 | Morgan | May 4, 1954 |

FOREIGN PATENTS

| 127,581 | Germany | Jan. 24, 1902 |